(12) United States Patent
Beauvais et al.

(10) Patent No.: US 10,717,420 B2
(45) Date of Patent: Jul. 21, 2020

(54) VEHICLE BRAKE OPERATION

(71) Applicant: Ford Global Technologies, LLC, Dearborn, MI (US)

(72) Inventors: Brandon Beauvais, Dearborn, MI (US); Daniel A. Gabor, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 102 days.

(21) Appl. No.: 15/917,892

(22) Filed: Mar. 12, 2018

(65) Prior Publication Data
US 2019/0275992 A1 Sep. 12, 2019

(51) Int. Cl.
| | |
|---|---|
| *B60T 7/04* | (2006.01) |
| *B60T 13/66* | (2006.01) |
| *B60T 13/16* | (2006.01) |
| *B60T 13/68* | (2006.01) |
| *B60T 7/12* | (2006.01) |
| *B60T 7/18* | (2006.01) |
| *B60T 7/22* | (2006.01) |
| *G01S 17/00* | (2020.01) |
| *B60T 8/17* | (2006.01) |
| *G01S 15/00* | (2020.01) |
| *G01S 13/00* | (2006.01) |

(52) U.S. Cl.
CPC ............ *B60T 7/045* (2013.01); *B60T 7/12* (2013.01); *B60T 7/18* (2013.01); *B60T 7/22* (2013.01); *B60T 8/17* (2013.01); *B60T 13/166* (2013.01); *B60T 13/662* (2013.01); *B60T 13/686* (2013.01); *G01S 13/00* (2013.01); *G01S 15/00* (2013.01); *G01S 17/00* (2013.01); *B60T 2220/04* (2013.01)

(58) Field of Classification Search
CPC ........ B60T 13/68; B60T 13/686; B60T 13/74; B60T 7/045; B60T 7/12; B60T 13/662; B60T 2220/04; B60T 7/06
See application file for complete search history.

(56) References Cited

U.S. PATENT DOCUMENTS

| | | | |
|---|---|---|---|
| 4,600,243 A * | 7/1986 | Belart | ..................... B60T 8/885 |
| | | | 188/151 A |
| 5,010,782 A | 4/1991 | Asano et al. | |
| 5,842,364 A | 12/1998 | Oliver | |
| 6,316,897 B1 | 11/2001 | Ewing | |
| 7,047,837 B2 | 5/2006 | Hayashihara | |
| 7,350,882 B2 | 4/2008 | Kamiya et al. | |
| 2013/0181506 A1* | 7/2013 | Weiberle | ................. B60T 7/042 |
| | | | 303/3 |
| 2015/0344014 A1* | 12/2015 | Knechtges | ............. B60T 7/042 |
| | | | 701/70 |
| 2017/0057520 A1 | 3/2017 | Letwin et al. | |

\* cited by examiner

*Primary Examiner* — Melanie Torres Williams
(74) *Attorney, Agent, or Firm* — Frank A. MacKenzie; Bejin Bieneman PLC (57) ABSTRACT

A system includes a computer including a processor and a memory, the memory storing instructions executable by the processor to actuate a brake valve to drain a brake cylinder and then actuate the brake valve to isolate the brake cylinder and hold a brake pedal in a retracted position.

19 Claims, 11 Drawing Sheets

VEHICLE BRAKE OPERATION

BACKGROUND

Vehicles include brakes to slow and stop the vehicles. The brakes can output a brake torque to slow a vehicle wheel. In an autonomous vehicle, a vehicle computer can provide input to actuate the brake. However, a vehicle user may still provide input to actuate the brake. Problems arise when controlling movement of the vehicle components to prevent user input while the vehicle computer operates the autonomous vehicle.

DETAILED DESCRIPTION

A system includes a computer including a processor and a memory, the memory storing instructions executable by the processor to actuate a brake valve to drain a brake cylinder, and then, actuate the brake valve to isolate the brake cylinder and hold a brake pedal in a retracted position.

The instructions can further include instructions to actuate the brake valve to drain fluid from the brake cylinder into a fluid chamber.

The instructions can further include instructions to, upon receiving user input to the brake pedal, actuate the brake valve to isolate the brake cylinder to hold the brake pedal in the retracted position.

The instructions can further include instructions to actuate a fluid pump to draw fluid from the brake cylinder. The fluid pump can include a piston and a fluid chamber, and the instructions can further include instructions to actuate the piston to draw fluid from the brake cylinder into the fluid chamber. The instructions can further include instructions to actuate the piston to drain the fluid chamber into a fluid reservoir.

The instructions can further include instructions to, upon receiving input to operate a vehicle in an autonomous mode, actuate the brake valve to drain the brake cylinder.

The instructions can further include instructions to actuate a first brake valve to drain the brake cylinder and to actuate a second brake valve to isolate the brake cylinder.

The instructions can further include instructions to actuate the brake valve to drain the brake cylinder to move the brake pedal to the retracted position.

A vehicle brake system includes a brake cylinder, a brake pedal connected to the brake cylinder, a brake valve connected to the brake cylinder, means for actuating a brake valve to drain the brake cylinder, and means for actuating the brake valve to isolate the brake cylinder and hold the brake pedal in a retracted position.

The system can further include means for actuating a fluid pump to draw fluid from the brake cylinder. The fluid pump can include a piston and a fluid chamber, and the system can further include means for actuating the piston to draw fluid from the brake cylinder into the fluid chamber. The system can further include means for actuating the piston to drain the fluid chamber into a fluid reservoir.

The system can further include means for actuating the brake valve to drain the brake cylinder upon receiving input to operate a vehicle in an autonomous mode.

The system can further include means for actuating the brake valve to drain the brake cylinder to move the brake pedal to the retracted position.

A method includes actuating a brake valve to drain a brake cylinder, and then, actuating the brake valve to isolate the brake cylinder and hold a brake pedal in a retracted position.

The method can further include, upon receiving input to operate a vehicle in an autonomous mode, actuating the brake valve to drain the brake cylinder.

The method can further include actuating a fluid pump to draw fluid from the brake cylinder. The fluid pump can include a piston and a fluid chamber, and the method can further include actuating the piston to draw fluid from the brake cylinder into the fluid chamber. The method can further include actuating the piston to drain the fluid chamber into a fluid reservoir.

Further disclosed is a computer programmed to execute any of the above method steps. Yet further disclosed is a vehicle comprising the computer. Yet further disclosed is a computer program product, comprising a computer readable medium storing instructions executable by a computer processor, to execute any of the above method steps.

When the vehicle operates in an autonomous mode, the computer can hold the brake pedal in the retracted position to prevent user input to the brake. By draining the brake cylinder, the brake pedal can remain in the retracted position. Because the user typically cannot provide input to the brake pedal in the retracted position, the computer can operate the brake without input or interruption from the user. Furthermore, the computer can actuate components typically already present in the vehicle, reducing a total number of components required to operate the brake in the autonomous mode.

Figure 1:
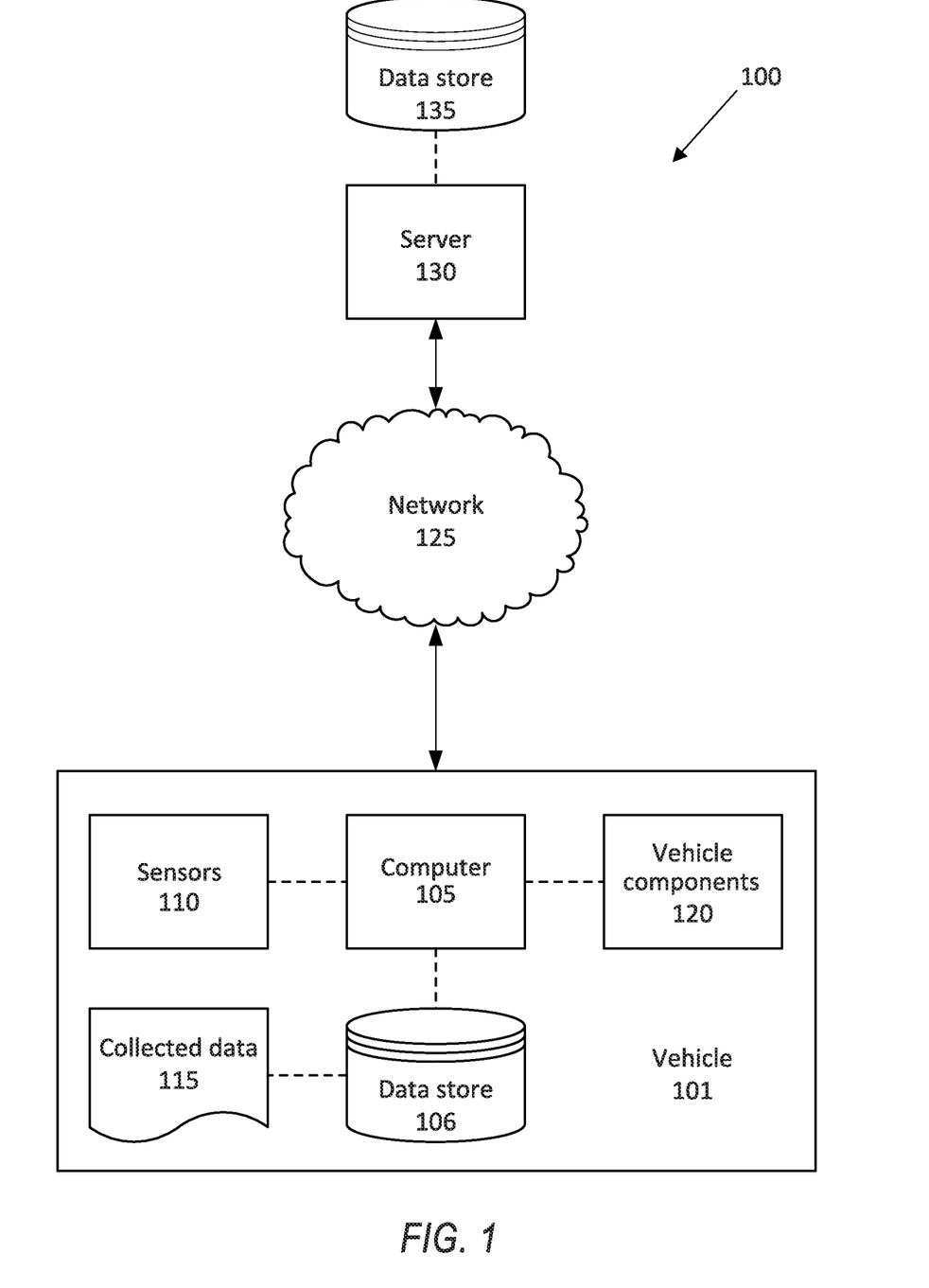
FIG. 1 is a block diagram of an example system for braking a vehicle.

FIG. 1 illustrates an example system 100 for braking a vehicle 101. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components provided to perform a mechanical or electro-mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
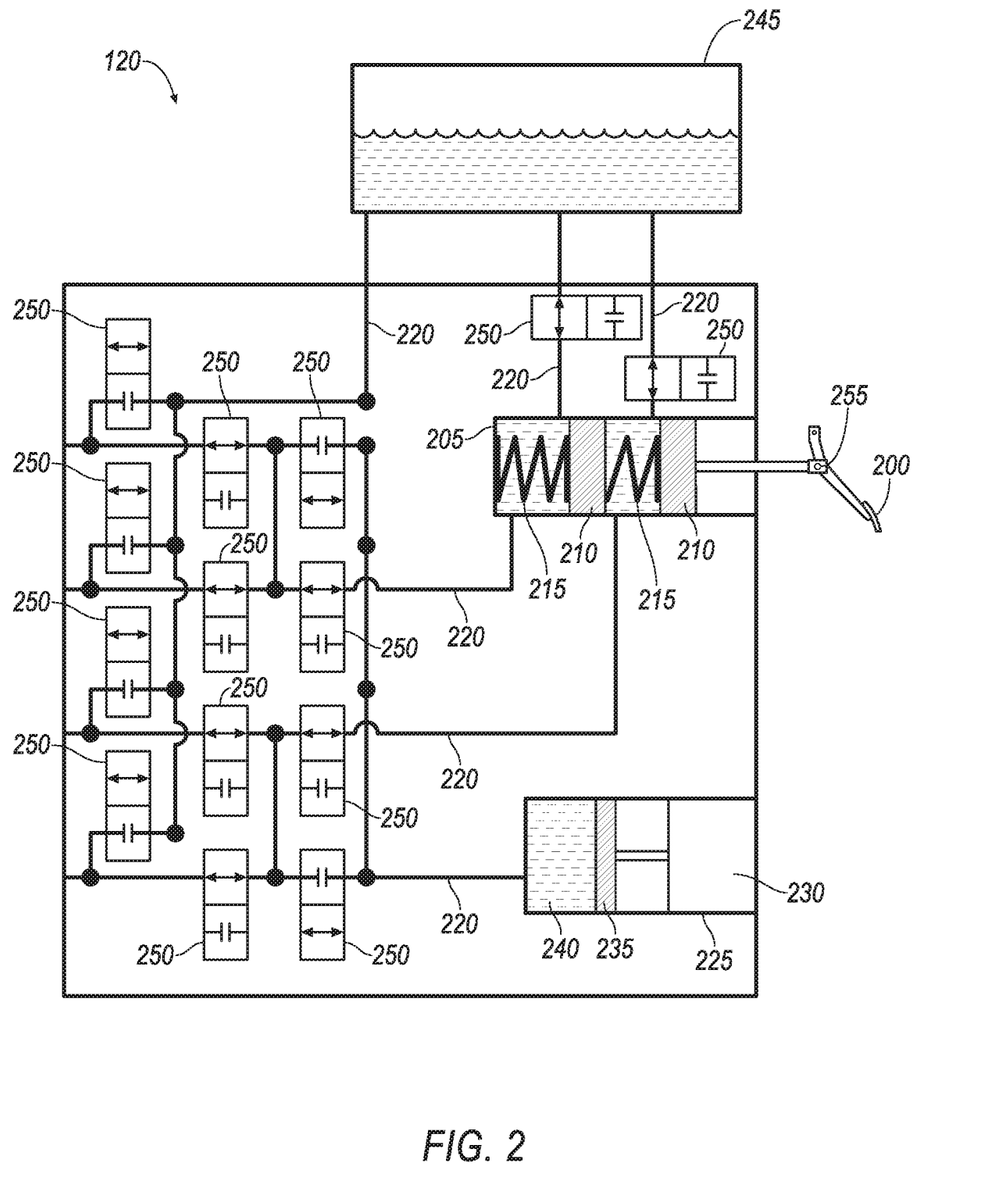
FIG. 2 illustrates an example brake.

FIG. 2 illustrates an example brake 120 in a vehicle 101. The brake 120 includes a brake pedal 200. The brake pedal 200 is movable from a deployed position to a retracted position. The brake pedal 200 receives user input to actuate the brake 120. As described below, the user can depress the brake pedal 200 to slow and stop the vehicle 101. When the computer 105 operates the vehicle 101 in the fully autonomous mode, the computer 105 can actuate the brake 120 without user input to the brake pedal 200. Thus, when the user provides input to the brake pedal 200 and the vehicle 101 is in the autonomous mode, the computer 105 can actuate portions of the brake 120 to account for the user input. The brake pedal 200 can be attached to a piston 210 at a pivot 255. The pivot 255 can be a connector that allows rotation of the brake pedal 200 relative to the piston 210, e.g., a bushing, a bearing, a joint, etc.

Figure 6:
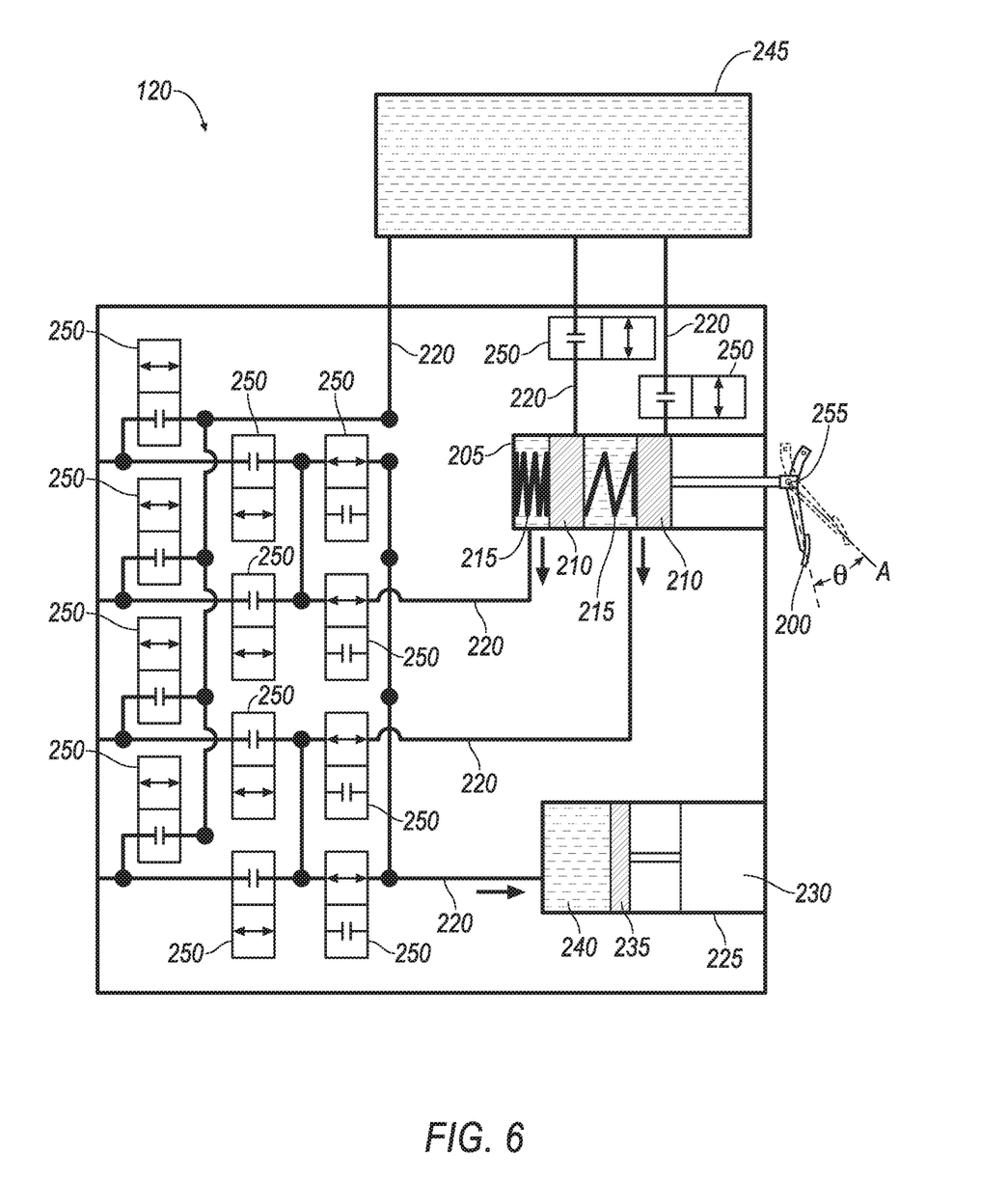
FIG. 6 illustrates the brake of FIG. 2 draining a brake cylinder into the fluid chamber.
Figure 8:
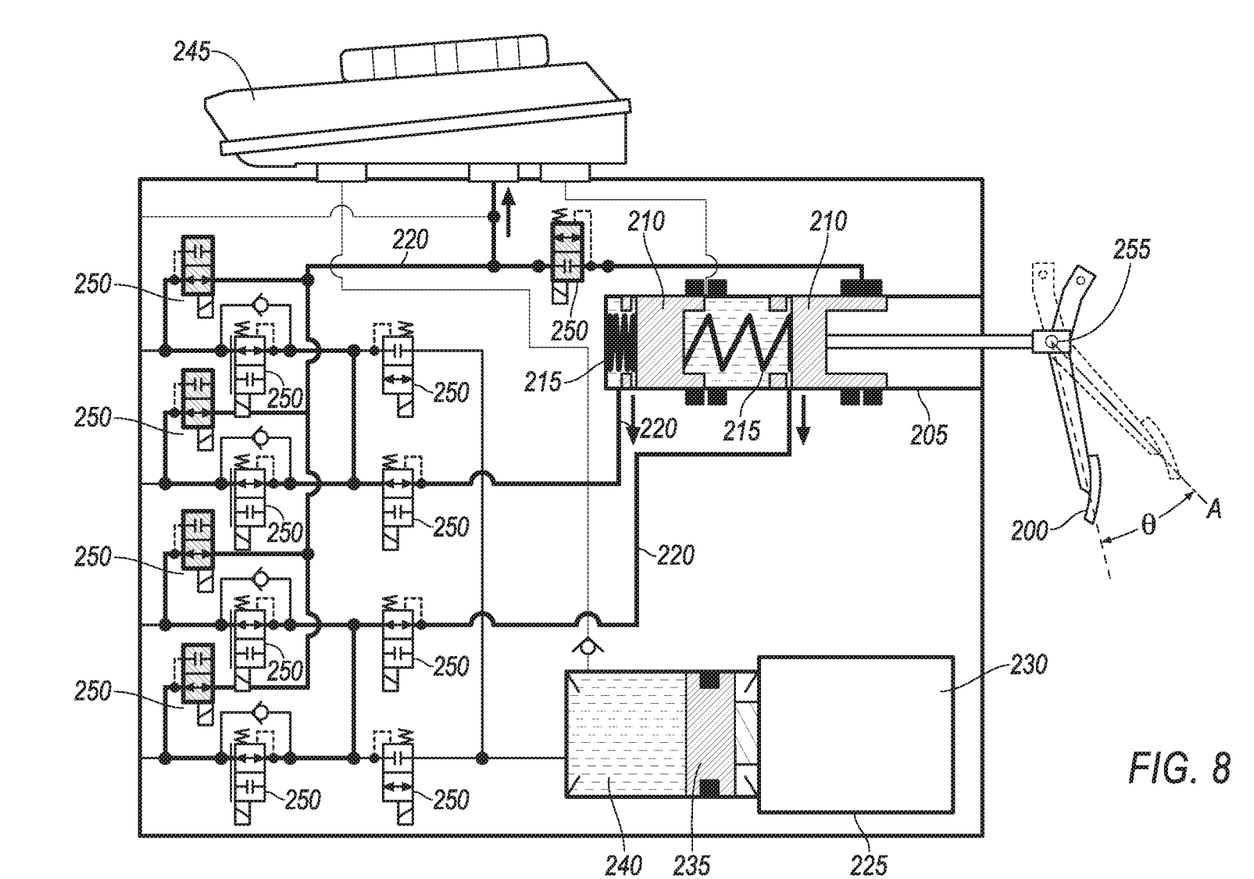
FIG. 8 illustrates the example brake of FIG. 7 draining a brake cylinder into a fluid reservoir.
Figure 9:
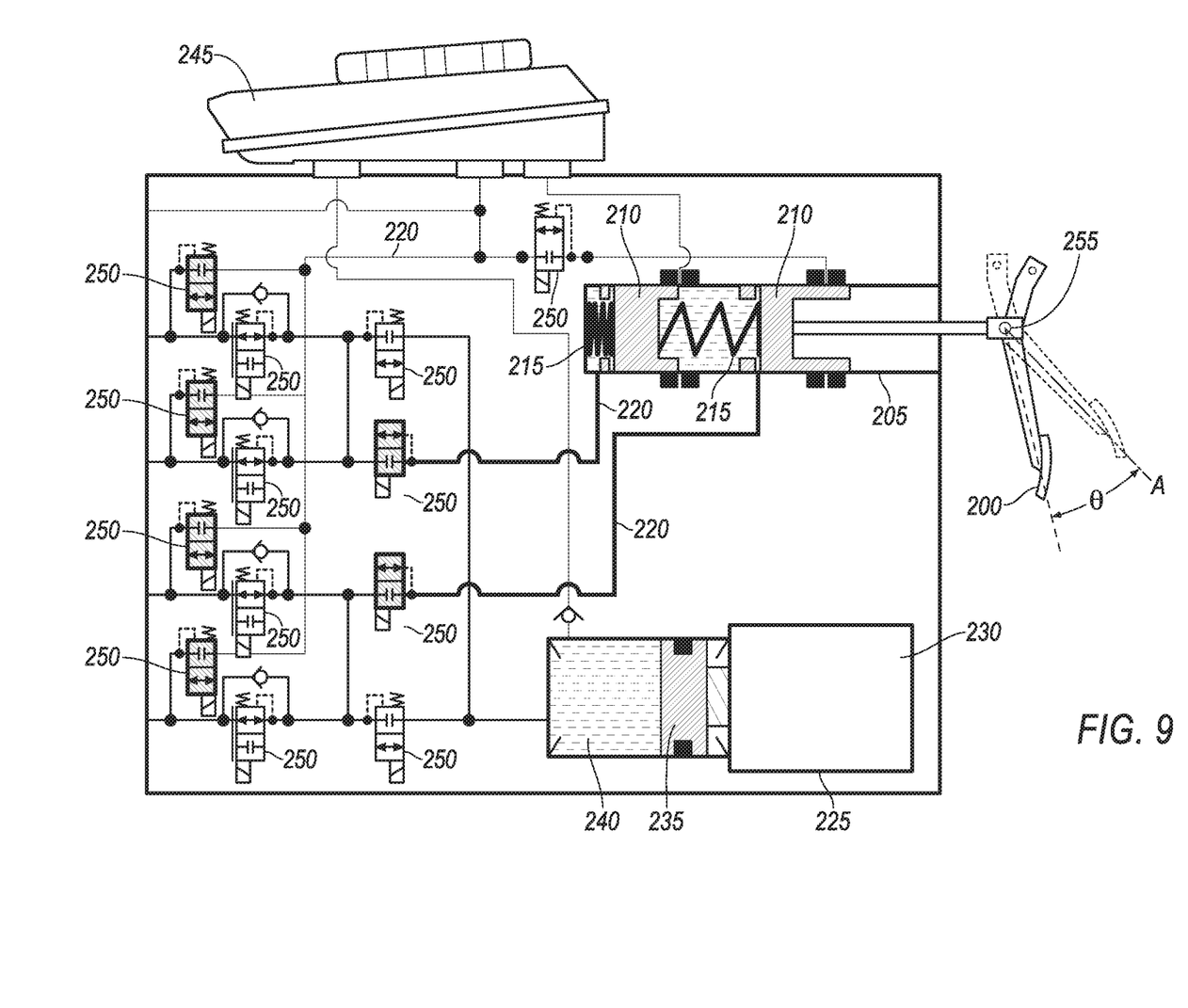
FIG. 9 illustrates the example brake of FIG. 7 isolating the brake cylinder.

The brake pedal 200 can define an angle θ between the deployed position and a current position of the brake pedal 200, i.e., a brake pedal 200 angle θ, as shown in FIGS. 6, 8, and 9. The brake pedal 200 extends along an axis A in the deployed position and rotates about the pivot 255 to define the brake pedal 200 angle θ. In FIGS. 6, 8, and 9, the brake pedal 200 is shown in the deployed position in hidden lines and in a current position in solid lines. The axis A, defined by the deployed position of the brake pedal 200, extends through the pivot 255. The angle between the deployed position and the current position, having a vertex at the pivot 255, defines the brake pedal 200 angle θ. When the brake pedal 200 is in the deployed position, i.e., the brake pedal 200 is aligned with the axis A, the brake pedal 200 angle θ is 0. When the brake pedal 200 receives user input, as shown in FIGS. 8-9, the brake pedal 200 rotates about the pivot 255 away from the axis A and defines the brake pedal 200 angle θ between the current position of the brake pedal 200 and the deployed position of the brake pedal 200. When the computer 105 moves the brake pedal 200 to the retracted position, as shown in FIG. 6, the position of the brake pedal 200 defines the brake pedal 200 angle θ. The brake pedal 200 can include a brake pedal 200 angle θ sensor 110 to determine the brake pedal 200 angle θ. The brake pedal 200 angle θ sensor 110 can be installed in the pivot 255 to measure rotation of the brake pedal 200. The brake pedal 200 angle θ sensor 110 can be a conventional sensor arranged in a conventional manner to detect a part's angle of rotation, e.g., a potentiometer that outputs a specific voltage based on rotation of a dial on the potentiometer, a magnetoresistive element that measures an orientation of a magnetic field, a rotary encoder, etc. The computer 105 can determine the brake pedal 200 angle θ based on, e.g., movement of the dial on the potentiometer. Based on the brake pedal 200 angle θ, the computer 105 can determine whether the brake pedal 200 is in the deployed position, the retracted position, or a position between the deployed position and the retracted position.

The example brake 120 includes a brake cylinder 205. The brake cylinder 205 is attached to the brake pedal 200. The brake cylinder includes brake fluid. The brake fluid can be, e.g., a mineral oil, a silicone-based liquid (e.g., DOT 5), a glycol-based liquid (e.g., DOT 3, DOT 4), etc. The brake cylinder 205 includes a piston 210 and a spring 215. The piston 210 is connected to the brake pedal 200. When the user depresses the brake pedal 200, the piston 210 coils the spring 215, pushing brake fluid from the brake cylinder 205. When the user releases the brake pedal 200, the spring 215 uncoils, pushing the piston 210 and drawing brake fluid into the brake cylinder 205.

The example brake 120 includes a plurality of fluid lines 220. The fluid lines 220 allow brake fluid to move to parts of the brake 120, e.g., brake pads. The fluid lines 220 can be, e.g., tubes that connect parts of the brake 120, e.g., the fluid lines 220 can connect the brake cylinder 205 to a fluid reservoir 245. The fluid lines 220 can be constructed of a flexible material, e.g., a plastic, a metal mesh, etc., and/or the fluid lines 220 can be constructed from a rigid material, e.g., a metal, a ceramic, etc.

The example brake 120 includes a brake fluid pump 225. The brake fluid pump 225 moves brake fluid through the fluid lines 220. The computer 105 can actuate the brake fluid pump 225 to stop the vehicle 101. The brake fluid pump 225 can include a motor 230, a piston 235, and a fluid chamber 240. The computer 105 can actuate the motor 230 to move the piston 235 into the fluid chamber 240, pumping brake fluid through the fluid lines 220. For example, the motor 230 can rotate a threaded rod connected to the piston 235, and based on a direction of rotation of the threaded rod, the piston 235 can move into or out from the fluid chamber 240. Thus, the computer 105 can actuate the motor 230 to rotate in a specific direction of rotation to move the piston 235 to pump the brake fluid in the fluid chamber 240.

The example brake 120 includes a fluid reservoir 245. The fluid reservoir 245 stores brake fluid used in the brake 120. The fluid reservoir 245 is connected to the fluid lines 220. The brake 120 can require a different volume of brake fluid based on whether the user actuates the brake pedal 200 and/or the computer 105 actuates the brake fluid pump 225. Excess brake fluid can be stored in the fluid reservoir 245 when not needed, and brake fluid can move from the fluid reservoir 245 to the brake cylinder 205 and/or the brake fluid pump 225 when needed.

The example brake 120 includes a plurality of brake valves 250. The brake valves 250 open and close the fluid lines 220, allowing the brake fluid to move through the fluid lines 220 to specific parts of the brake 120. The brake valves 250 are movable from an open position to a closed position. In the open position, indicated in FIGS. 2-9 by the arrows in the brake valve 250, the brake valve 250 allows brake fluid to pass through the fluid line 220. In the closed position, indicated in FIGS. 2-9 as the parallel lines with a gap in between in the brake valve 250, the brake valve 250 prevents brake fluid from passing through the fluid line 220. The computer 105 can actuate the brake valves 250 to drain the brake cylinder 205 and retract the brake pedal 200.

Figure 3:
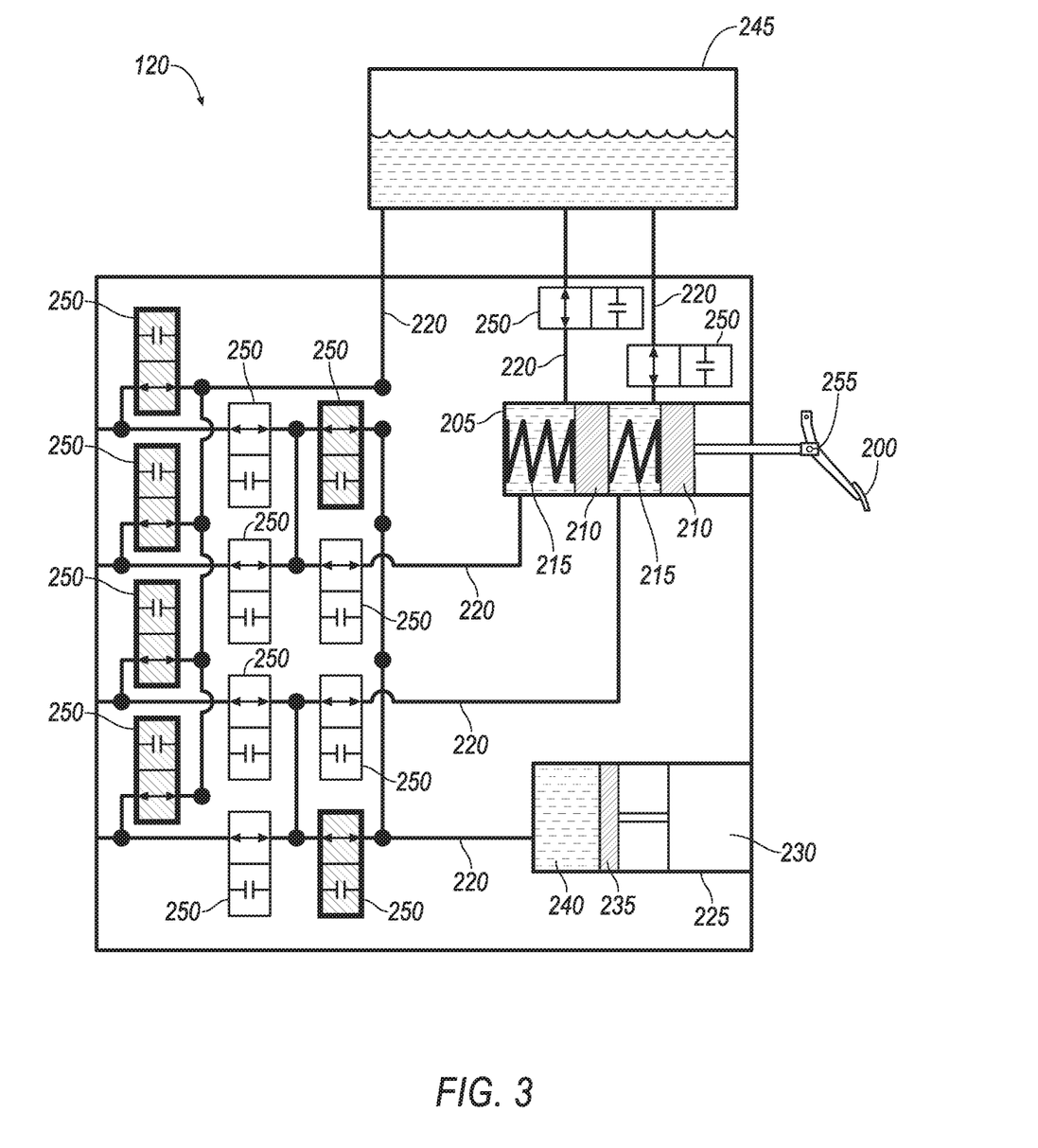
FIG. 3 illustrates the brake of FIG. 2 connecting a fluid chamber to a fluid reservoir.

FIGS. 3-6 illustrate the computer 105 determining to drain the brake cylinder 205 to move the brake pedal 200 to the retracted position. In the example of FIG. 3, the computer 105 actuates the brake valves 250 to connect the fluid chamber 240 to the fluid reservoir 245. The computer 105 actuates the brakes valves 250 shown in shading, moving them from their respective closed positions (as shown in FIG. 2) to their respective open positions. The brake valves 250 are selected based on whether the brake valves 250 are positioned in fluid lines 220 connecting the fluid chamber 240 to the fluid reservoir 245. When the shaded fluid valves 250 are in the open position, the fluid chamber 240 is connected to the fluid reservoir 245, and the motor 230 can actuate the piston 235 to drain the fluid chamber 240 into the fluid reservoir 245.

Figure 4:
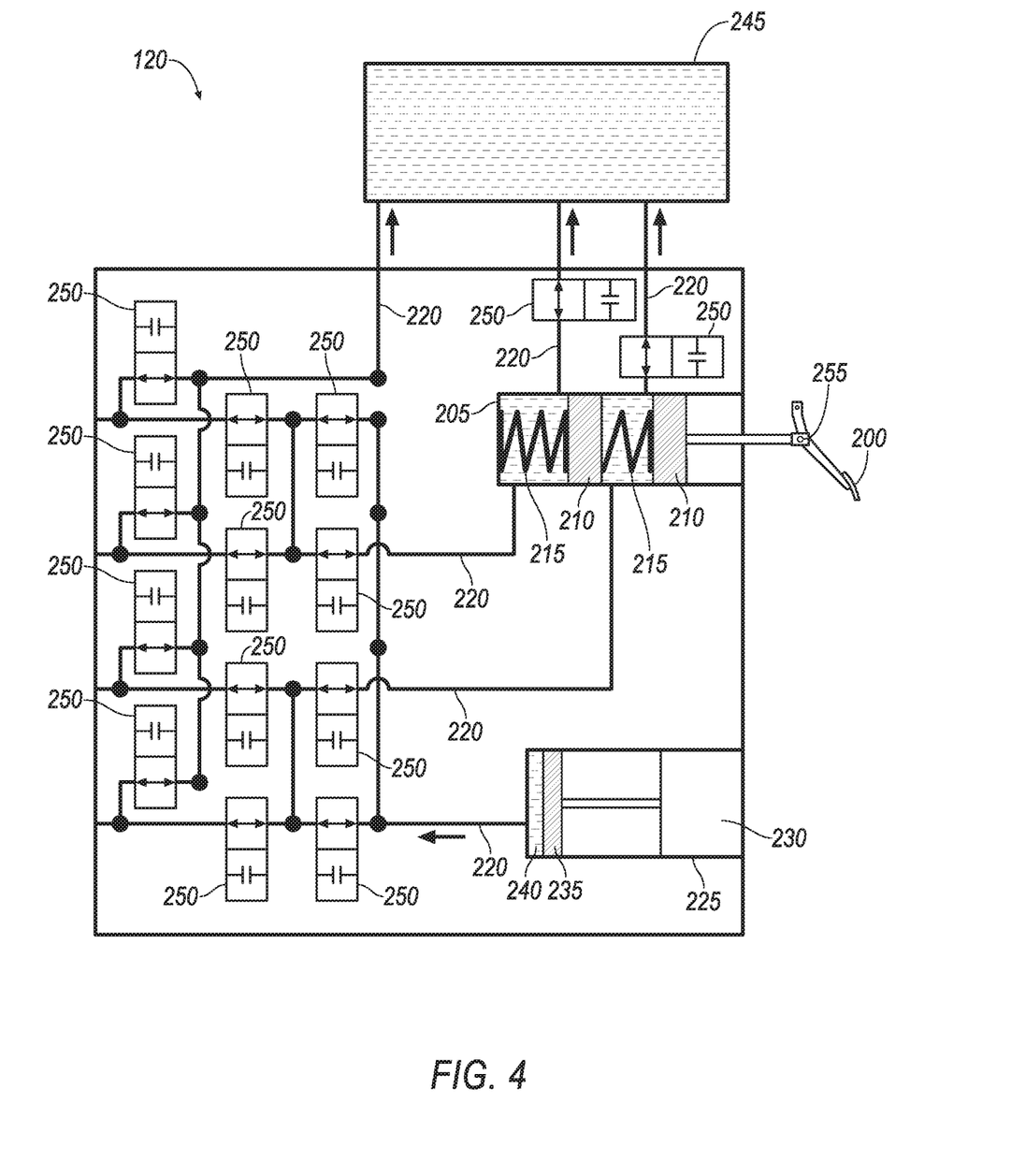
FIG. 4 illustrates the brake of FIG. 2 draining the fluid chamber.

FIG. 4 illustrates the computer 105 actuating the motor 230 to drain the fluid chamber 240 into the fluid reservoir 245. The computer 105 can actuate the motor 230, moving the piston 235 in the fluid chamber 240. As the piston 235 moves in the fluid chamber 240, the brake fluid moves from the fluid chamber 240 through the fluid lines 220 into the fluid reservoir 245. The computer 105 can actuate the motor 230 to move the piston 235 to a predetermined position in the fluid chamber 240 to move a volume of brake fluid to the fluid reservoir. The computer 105 can determine the predetermined position based on a correlation between an axial position of the piston 235 and a corresponding volume of the fluid chamber 240, e.g., based on a cross-sectional area of the fluid chamber 240. The computer 105 can determine the predetermined position to allow a volume of brake fluid in the brake cylinder 205 (e.g., previously determined based on a size of the brake cylinder 205 and stored in the data store 106 and/or the server 130) to move into the fluid chamber 240. FIG. 4 shows the fluid reservoir 245 having more shading than in FIGS. 2-3, indicating that the volume of brake fluid that was once in the fluid chamber 240 is now in the fluid reservoir 245.

Figure 5:
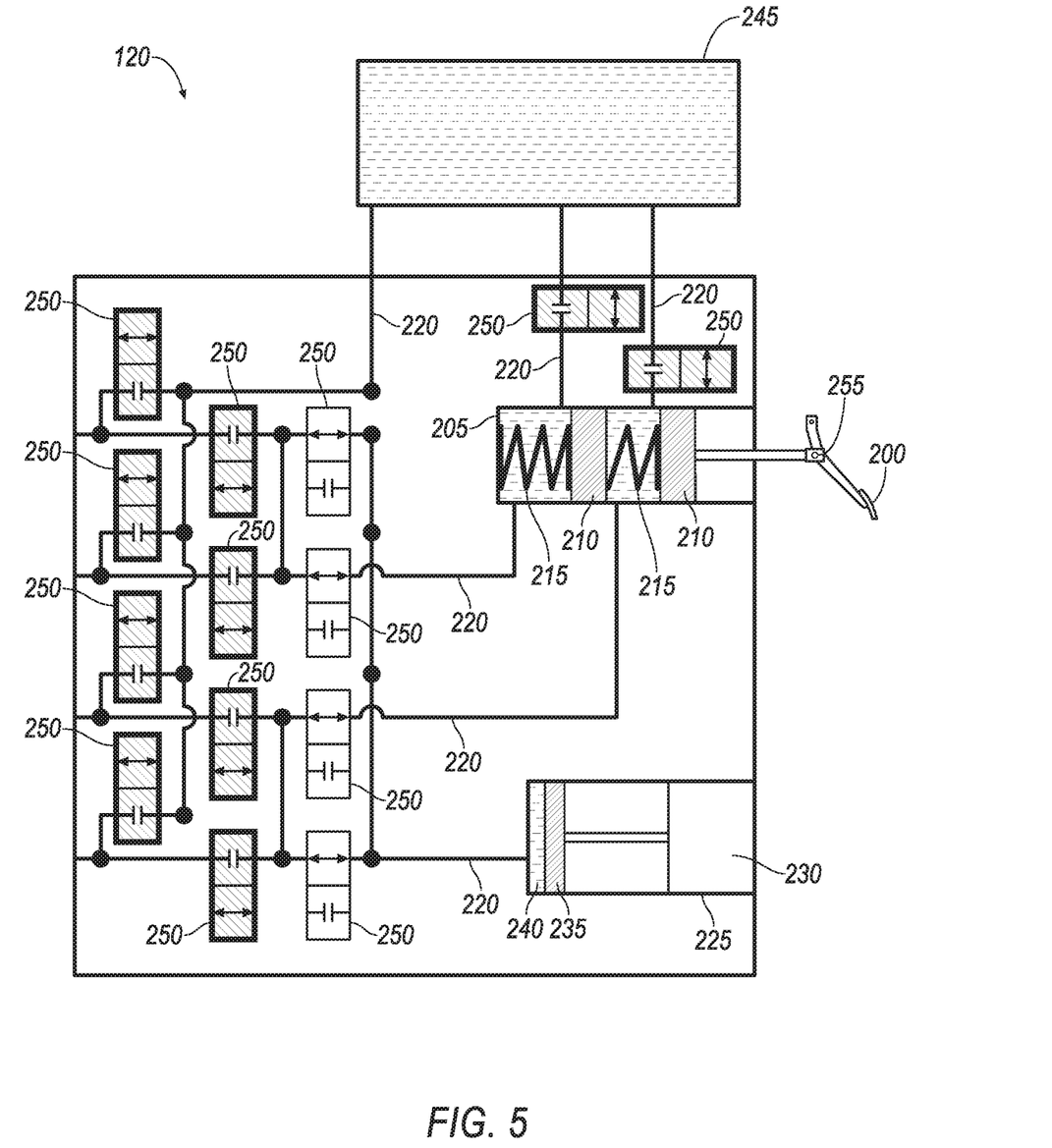
FIG. 5 illustrates the brake of FIG. 2 isolating the fluid chamber.

FIG. 5 illustrates the computer 105 actuating brake valves 250 to isolate the brake cylinder 205 and the fluid chamber 240 from the fluid reservoir 245. Upon draining the fluid chamber 240, the computer 105 can actuate the brake valves 250 to isolate the brake cylinder 205 and the fluid chamber 240 from the fluid reservoir 245 to prevent fluid from the fluid reservoir 245 moving into the brake cylinder 205 and the fluid chamber 240. By isolating the brake cylinder 205 and the fluid chamber 240, the brake fluid from the brake cylinder 205 can move only into the fluid chamber 240. The computer 105 can actuate the brake valves 250 shaded in FIG. 5, moving these brake valves 250 from the respective open positions to the respective closed positions. The brake valves 250 are selected based on whether the brake valves 250 are positioned in fluid lines 220 connecting the fluid chamber 240 to the fluid reservoir 245. The brake valves 250 closed as shown in FIG. 5 close the fluid lines 220 connecting the brake cylinder 205 and the fluid chamber 240 to the fluid reservoir 245, preventing brake fluid from moving from the fluid reservoir 245 to the fluid chamber 240. The selected brake valves 250 thus isolate the fluid chamber 240 from the fluid reservoir 245. The remaining brake valves 250 in their respective open positions connect the brake cylinder 205 to the fluid chamber 240.

FIG. 6 illustrates the brake fluid pump 225 drawing brake fluid from the brake cylinder 205. The computer 105 can actuate the motor 230 to move the piston 235, drawing a vacuum in the fluid chamber 240. The vacuum can draw brake fluid from the fluid lines 220 into the fluid chamber 240. Because the brake cylinder and the fluid chamber 240 are isolated from the fluid reservoir 245, only the brake fluid from the brake cylinder 205 moves through the fluid lines 220 and into the fluid chamber 240, draining the brake cylinder 205. When the brake cylinder 205 drains, the brake piston 210 pulls the brake pedal 200 to the retracted position. Thus, upon draining the brake cylinder 205, the brake pedal 200 is moved from the deployed position to the retracted position. The computer 105 can actuate the motor 230 to move the piston 235 until the brake pedal 200 angle θ sensor 110, as described above, indicates that the brake pedal 200 is in the retracted position. Alternatively, the computer 105 can actuate the motor 230 to move the piston 235 until the piston 235 reaches a second predetermined position in the fluid chamber 240 at which the volume of the brake fluid in the fluid chamber 240 includes the volume of the brake cylinder 205. As described above, the volume of the brake cylinder 205 in the deployed position and in the retracted position can be a predetermined value based on a size of the brake cylinder 205, and when the volume of the fluid chamber 240, as determined based on the position of the piston 235, includes the volume of the brake cylinder 205, the computer 105 can determine that the brake cylinder 205 has been drained.

Figure 7:
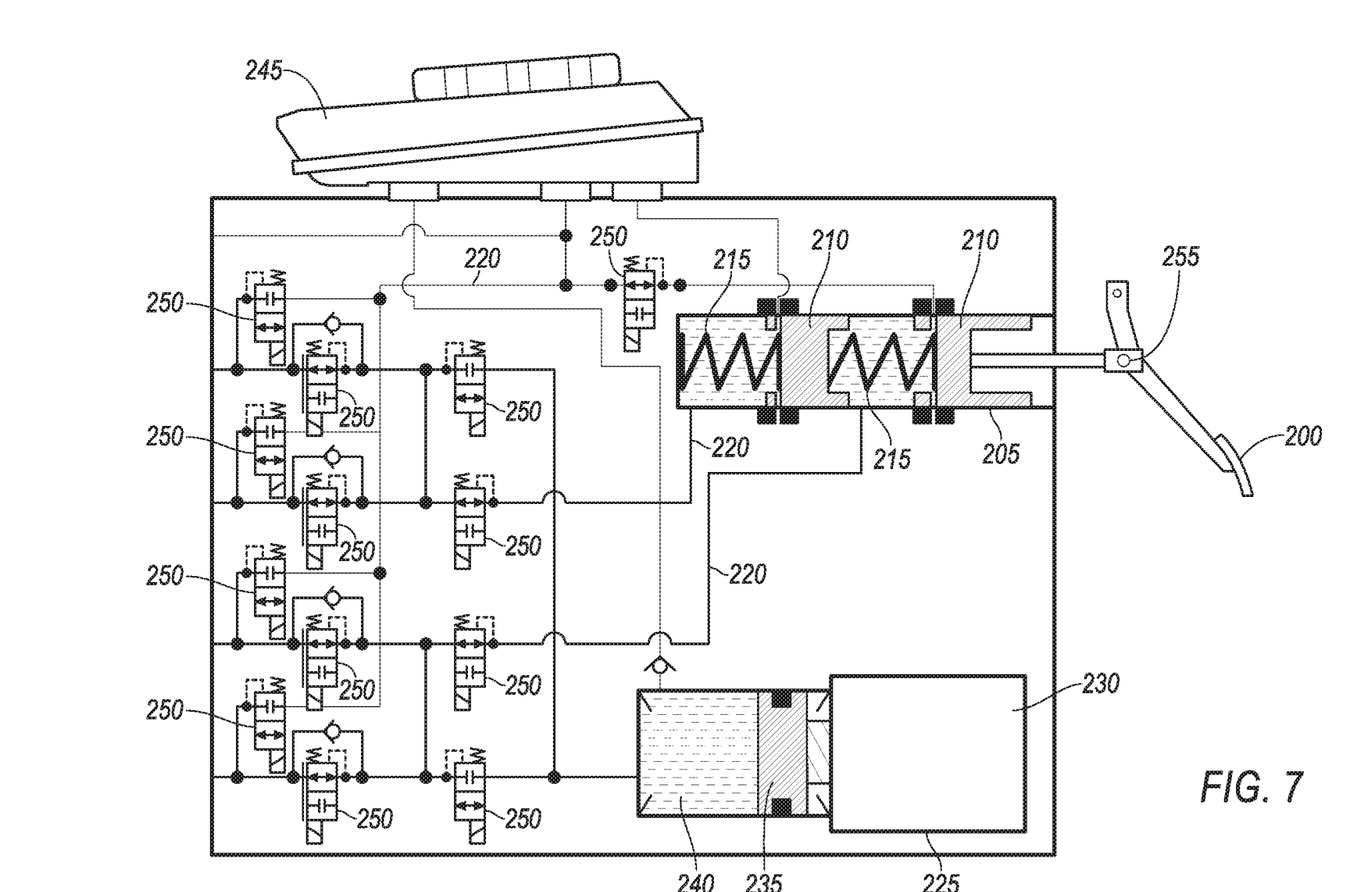
FIG. 7 illustrates an example brake.

FIGS. 7-9 illustrate the computer 105 draining and isolating the brake cylinder 205 upon receiving input to the brake pedal 200. FIG. 7 illustrates the example brake 120 in a manual mode or semi-autonomous mode in which the vehicle 101 user can provide input to the brake 120. The computer 105 can receive user input to transition into the autonomous mode and to actuate the brake 120 without input from the user. Upon receiving the user input to transition into the autonomous mode, the computer 105 can instruct the user to depress the brake pedal 200 to the retracted position. For example, the computer 105 can display an instruction on human-machine interface (HMI), e.g., a touchscreen, a portable device, etc. Alternatively or additionally, the computer 105 can instruct a speaker to emit an audio message instructing the user to depress the brake pedal 200. Upon depressing the brake pedal 200 to the retracted position, the computer 105 can drain and isolate the brake cylinder 205, holding the brake pedal 200 in the retracted position.

FIG. 8 illustrates the computer 105 draining the brake cylinder 205 upon receiving input to the brake pedal 200. The computer 105 can determine that the user has provided input to the brake pedal 200, e.g., with a brake pedal 200 angle θ sensor 110 as described above. When the computer 105 determines that the user has depressed the brake pedal 200, the computer 105 can actuate at least one brake valve 250 to connect the brake cylinder 205 to the fluid reservoir 245. In the example of FIG. 8, the computer 105 actuates four brake valves 250, shown in shading, to the open position, and one valve 250, also shown in shading, to the closed position. The newly opened brake valves 250 connect the brake cylinder 205 to the fluid reservoir 245. The newly closed brake valve 250 isolates one of the fluid lines 220 between the fluid reservoir 245 and the brake cylinder 205. Thus, brake fluid can move through the fluid lines 220 from the brake cylinder 205 into the fluid reservoir 245, but not from the fluid reservoir 245 to the brake cylinder 205. The brake fluid in the brake cylinder 205 can move through the fluid lines 220 and the brake valves 250 into the fluid reservoir 245, as shown with the arrows.

FIG. 9 illustrates the computer 105 isolating the brake cylinder 205 when the brake pedal 200 is in the retracted position. The computer 105 can determine that the brake pedal 200 is in the retracted position based on, e.g., the brake pedal 200 angle θ sensor 110. When the computer 105 determines that the brake pedal 200 is in the retracted position, the computer 105 can actuate at least one brake valve 250 to isolate the brake cylinder 205 from the fluid reservoir 245. In the example of FIG. 9, the computer actuates four brake valves 250 to the open position and two brake valves 250 to the closed position. The brake valves 250 newly moved to the closed position prevent brake fluid from moving from the fluid reservoir 245 to the brake cylinder 205, isolating the brake cylinder 205 from the fluid reservoir 245. Thus, because the brake cylinder 205 is drained, the brake pedal 200 remains in the retracted position when the user removes input from the brake pedal 200.

Figure 10:
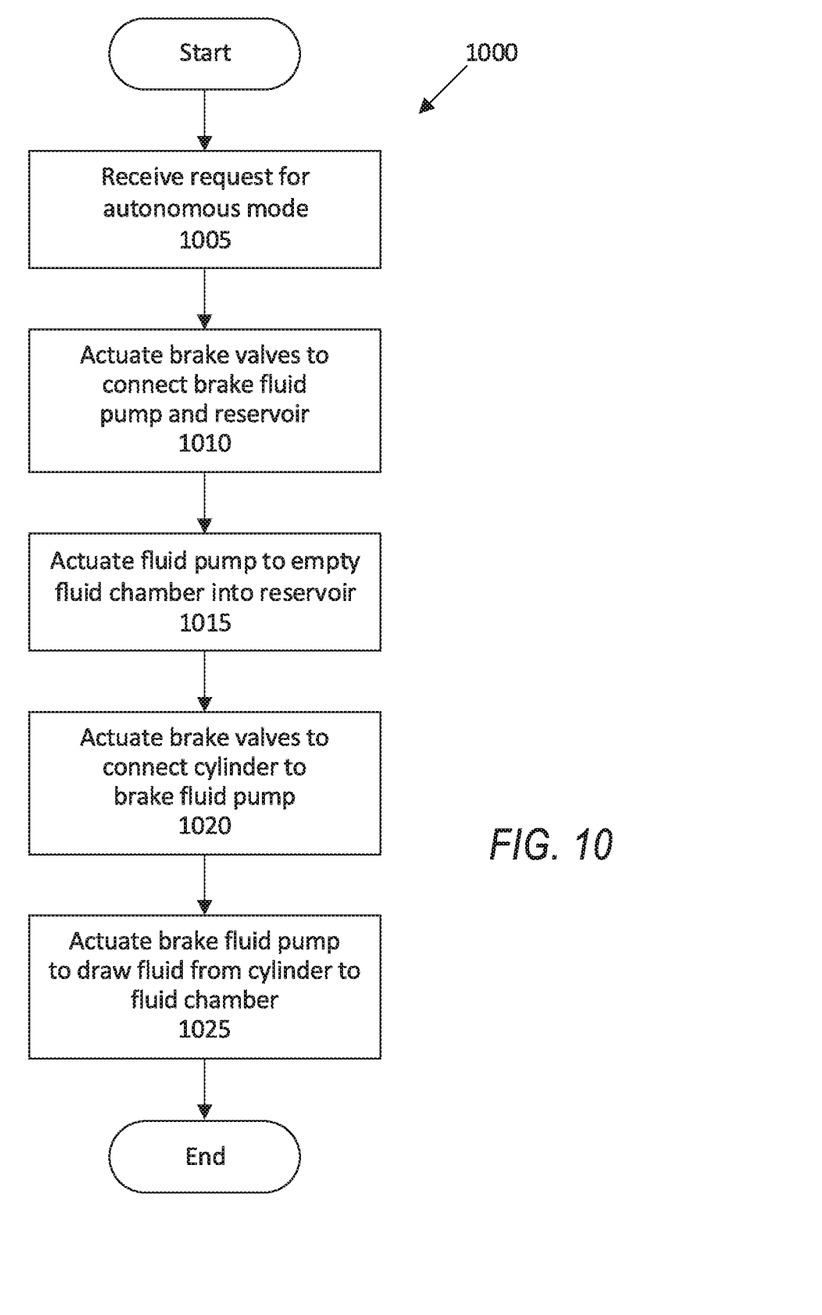
FIG. 10 is a block diagram of an example process for retracting a brake pedal.

FIG. 10 illustrates an example process 1000 for retracting a brake pedal 200 without input from a vehicle 101 user. The process 1000 begins in a block 1005, in which the computer 105 receives a request to operate the vehicle 101 in an autonomous mode. As described above, a user can request the computer 105 to operate the vehicle 101 in the autonomous mode without further input from the user. The user can provide input to, e.g., a button, a touchscreen, etc., to request the computer 105 to operate the vehicle 101 in the autonomous mode.

Next, in a block 1010, the computer 105 actuates one or more brake valves 250 to connect a brake fluid pump 225 to a fluid reservoir 245. As described above and shown in FIG. 3, the computer 105 can actuate at least one brake valve 250 to its respective open position to connect a fluid chamber 240 of the brake fluid pump 225 with the fluid reservoir 245.

Next, in a block 1015, the computer 105 actuates the brake fluid pump 225 to drain the fluid chamber 240 into the fluid reservoir 245. As described above and shown in FIG. 4, the computer 105 can actuate a motor 230 of the brake fluid pump 225 to move a piston 235 into the fluid chamber 240, pushing the brake fluid in the fluid chamber 240 into the fluid lines 220 and to the fluid reservoir 245. Draining the fluid chamber 240 allows the brake fluid pump 225 to receive brake fluid from the brake cylinder 205.

Next, in a block 1020, the computer 105 actuates one or more brake valves 250 to isolate the fluid chamber 240 from the fluid reservoir 245 and to connect the fluid chamber 240 to the brake cylinder 205. As described above and shown in FIG. 5, the computer 105 can actuate one or more brake valves 250 to prevent brake fluid from moving from the fluid reservoir 245 to the fluid chamber 240 and to allow brake fluid to move from the brake cylinder 205 to the fluid chamber 240. Thus, brake fluid can move only between the brake cylinder 205 and the fluid chamber 240.

Next, in a block 1025, the computer 105 actuates the brake fluid pump 225 to draw brake fluid from the brake cylinder 205 into the fluid chamber 240, retracting the brake pedal 200. As described above and shown in FIG. 6, the computer 105 can actuate the motor 230 to move the piston 235 away from the fluid chamber 240, drawing brake fluid from the brake cylinder 205 through the fluid lines 220 and into the fluid chamber 240. As the brake fluid leaves the brake cylinder 205, the brake piston 210 retracts and coils the spring 215, moving the brake pedal 200 to the retracted position. Following the block 1025, the process 1000 ends.

Figure 11:
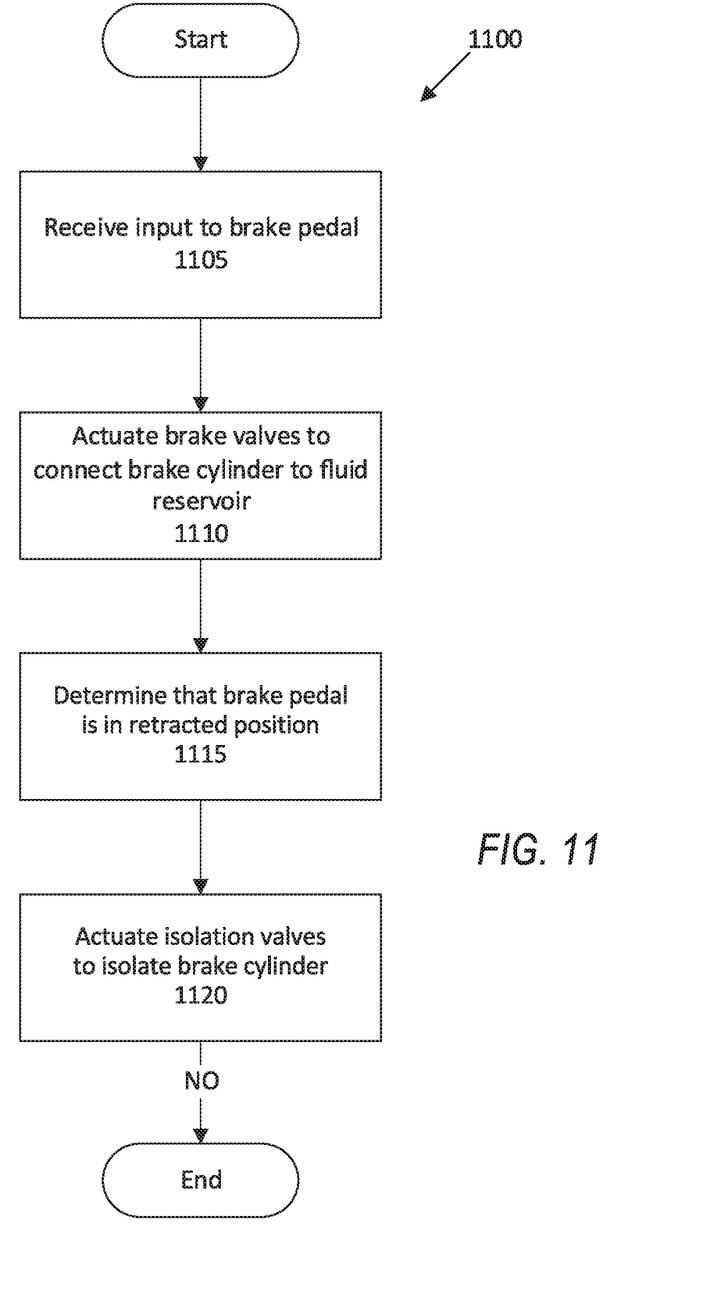
FIG. 11 is a block diagram of an example process for draining a brake cylinder upon input to a brake pedal.

FIG. 11 illustrates an example process 1100 for retracting the brake pedal 200 with user input. The process 1100 begins in a block 1105, in which the computer 105 determines that the user has provided input to the brake pedal 200. When the computer 105 operates the vehicle 101 in the autonomous mode, the computer 105 can request the user to move the brake pedal 200 to the retracted position. The computer 105 can actuate a sensor 110, e.g., a brake pedal 200 angle θ sensor 110, to determine that the user has provided input to the brake pedal 200.

Next, in a block 1110, the computer 105 actuates one or more brake valves 250 to connect the brake cylinder 205 to the fluid reservoir 245. As described above and shown in FIG. 8, the computer 105 can actuate brake valves 250 to allow brake fluid to move from the brake cylinder 205 to the fluid reservoir 245.

Next, in a block 1115, the computer 105 determines that the brake pedal 200 is in the retracted position. As described above, the computer 105 can actuate a brake pedal 200 angle θ sensor 110 to collect data 115 about the brake pedal 200 angle θ. When the brake pedal 200 angle θ is beyond a predetermined threshold determined based on empirical data 115 of user input to the brake pedal 200, the computer 105 can determine that the brake pedal 200 is in the retracted position.

Next, in a block 1120, the computer 105 actuates one or more brake valves 250 to isolate the brake cylinder 205 from the fluid reservoir 245. As described above and shown in FIG. 9, the computer 105 can actuate one or more brake valves 250 to prevent brake fluid from moving through the fluid lines 220 from the fluid reservoir 245 to the brake cylinder 205. Because the brake pedal 200 is in the retracted position and the brake cylinder 205 has been drained, isolating the brake cylinder 205 prevents brake fluid from moving to the brake cylinder 205 and prevents the brake pedal 200 from moving to the deployed position. Thus, the computer 105 can operate the vehicle 101 in the autonomous mode without user input to the brake pedal 200. Following the block 1120, the process 1100 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl—, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 1000, one or more of the steps could be omitted, or the steps could be executed in a different order than shown in FIG. 10. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   upon receiving input to operate a vehicle in an autonomous mode, actuate a brake valve to drain a brake cylinder attached to a brake pedal; and
   then, actuate the brake valve to isolate the brake cylinder from a fluid reservoir and hold the brake pedal in a retracted position.

2. The system of claim 1, wherein the instructions further include instructions to actuate the brake valve to drain fluid from the brake cylinder into a fluid chamber.

3. The system of claim 1, wherein the instructions further include instructions to, upon receiving user input to the brake pedal, actuate the brake valve to isolate the brake cylinder to hold the brake pedal in the retracted position.

4. The system of claim 1, wherein the instructions further include instructions to actuate a fluid pump to draw fluid from the brake cylinder.

5. The system of claim 4, wherein the fluid pump includes a piston and a fluid chamber, and the instructions further include instructions to actuate the piston to draw fluid from the brake cylinder into the fluid chamber.

6. The system of claim 5, wherein the instructions further include instructions to actuate the piston to drain the fluid chamber into the fluid reservoir.

7. The system of claim 1, wherein the instructions further include instructions to actuate a first brake valve to drain the brake cylinder and to actuate a second brake valve to isolate the brake cylinder.

8. The system of claim 1, wherein the instructions further include instructions to actuate the brake valve to drain the brake cylinder to move the brake pedal to the retracted position.

9. A method, comprising:
upon receiving input to operate a vehicle in an autonomous mode, actuating a brake valve to drain a brake cylinder attached to a brake pedal; and
then, actuating the brake valve to isolate the brake cylinder from a fluid reservoir and hold the brake pedal in a retracted position.

10. The method of claim 9, further comprising actuating a fluid pump to draw fluid from the brake cylinder.

11. The method of claim 10, wherein the fluid pump includes a piston and a fluid chamber, and the method further comprises actuating the piston to draw fluid from the brake cylinder into the fluid chamber.

12. The method of claim 11, further comprising actuating the piston to drain the fluid chamber into the fluid reservoir.

13. A system, comprising a computer including a processor and a memory, the memory storing instructions executable by the processor to:
actuate a brake valve to drain fluid from a brake cylinder attached to a brake pedal into a fluid chamber; and
then, actuate the brake valve to isolate the brake cylinder from a fluid reservoir and hold the brake pedal in a retracted position.

14. The system of claim 13, wherein the instructions further include instructions to actuate a fluid pump to draw fluid from the brake cylinder.

15. The system of claim 13, wherein the instructions further include instructions to actuate a fluid pump to draw fluid from the brake cylinder.

16. The system of claim 15, wherein the fluid pump includes a piston and a fluid chamber, and the instructions further include instructions to actuate the piston to draw fluid from the brake cylinder into the fluid chamber.

17. The system of claim 16, wherein the instructions further include instructions to actuate the piston to drain the fluid chamber into the fluid reservoir.

18. The system of claim 13, wherein the instructions further include instructions to actuate a first brake valve to drain the brake cylinder and to actuate a second brake valve to isolate the brake cylinder.

19. The system of claim 13, wherein the instructions further include instructions to actuate the brake valve to drain the brake cylinder to move the brake pedal to the retracted position.

* * * * *